(12) United States Patent
Bonam et al.

(10) Patent No.: US 12,417,138 B2
(45) Date of Patent: Sep. 16, 2025

(54) INTELLIGENT FEATURE CONTROLLER

(71) Applicant: Bank of America Corporation, Charlotte, NC (US)

(72) Inventors: Sandeep Kumar Bonam, Telangana (IN); Mary Joseph, Telangana (IN); Lavanya Sambaraju, Telangana (IN); Aditi Gupta, Rajasthan (IN)

(73) Assignee: Bank of America Corporation, Charlotte, NC (US)

( * ) Notice: Subject to any disclaimer, the term of this patent is extended or adjusted under 35 U.S.C. 154(b) by 178 days.

(21) Appl. No.: 18/115,814

(22) Filed: Mar. 1, 2023

(65) Prior Publication Data
US 2024/0296086 A1    Sep. 5, 2024

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01); *G06F 11/0751* (2013.01); *G06F 11/0793* (2013.01)

(58) Field of Classification Search
CPC ............... G06F 11/079; G06F 11/0721; G06F 11/0751; G06F 11/0793
See application file for complete search history.

(56) References Cited

U.S. PATENT DOCUMENTS

| 10,419,407 B2 | 9/2019 | Daskalopoulos et al. |
| 10,936,155 B1 | 3/2021 | Shearer |
| 2024/0154877 A1* | 5/2024 | L .......................... H04L 41/0654 |

OTHER PUBLICATIONS

Chawla et al., "Intelligent Monitoring of IoT Devices Using Neural Networks," IEEE Xplore, Jul. 15, 2022.

* cited by examiner

*Primary Examiner* — Amine Riad
(74) *Attorney, Agent, or Firm* — Weiss & Arons LLP (57) ABSTRACT

An intelligent feature controller is provided. The intelligent feature controller identifies failures to various features within a network. The intelligent feature controller identifies features that are dependent on the failed features within the network. The intelligent feature controller turns off the features that are dependent on the failed features within the network. As such, the network may continue operating with certain features being turned off. This limits the failures within the network to the affected features, instead of entire systems failing because of a failed feature.

20 Claims, 7 Drawing Sheets

INTELLIGENT FEATURE CONTROLLER

FIELD OF TECHNOLOGY

Aspects of the disclosure relate to failure remediation at a computing network.

BACKGROUND OF THE DISCLOSURE

In enterprise software systems, multiple systems may be interconnected, and/or dependent on one another. At times, a particular subcomponent of the software system may incur a failure and/or enter into a non-operational state. As a result of an error state or unavailability of a particular subcomponent of the software system, one or more other subcomponents, within the software system, may be affected or impaired.

A controller system that continually monitors the health and operation of each subcomponent of the software system would be desirable. It would be further desirable for the controller system to identify the interdependencies between the various subcomponents. It would be further desirable for the controller system to turn on or off subcomponents based on subcomponents availability and/or the availability of one or more other subcomponents, on which the subcomponents depend.

SUMMARY OF THE DISCLOSURE

Apparatus and methods for intelligently controlling features within a computing environment is provided. Methods may include monitoring one or more applications, systems or features for incidents. The monitoring may be executed by one or more monitors. In some embodiments, each application, system or feature may be assigned a monitor.

Methods may also include actively listening for incident information from the one or more monitors. A listener subcomponent may execute the active listening.

Methods may also include receiving notification of an incident. The notification of the incident may be received from the listener subcomponent at an artificial intelligence/machine learning powered main subcomponent. The notification of the incident may include incident details.

Methods may also include iterating through a historical database to identify similar historical incidents using an artificial intelligence/machine learning algorithm. The artificial intelligence/machine learning powered main subcomponent may execute the iterating.

Methods may also include matching a pattern of the incident to a pattern of one or more similar historical incidents. The artificial intelligence/machine learning powered main subcomponent may execute the matching.

Methods may include identifying an outcome for the incident based on an outcome of the one or more similar historical incidents. The artificial intelligence/machine learning powered main subcomponent may execute the identifying. The outcome for the incident being either operational or failure.

Methods may also include ignoring the incident when the outcome of the incident is operational. The artificial intelligence/machine learning powered main subcomponent may instruct the execution of the ignoring.

Methods may also include invoking a feature controller subcomponent when the outcome of the incident is failure. The artificial intelligence/machine learning powered main subcomponent may execute the invoking the feature controller subcomponent.

Methods may also include receiving a notification of the incident. The notification of the incident may be received at the feature controller subcomponent.

Methods may also include generating a query comprising one or more details of a location of the incident. The query may also include a primary feature impacted by the incident. The primary feature may be the computing location, or network communicator, where the incident occurred. The query may also include details relating to the incident. The query may include information retrieved from the notification of the incident and/or the incident information. The feature controller subcomponent may generate the query.

Methods may also include transmitting the query to a dependency repository. The feature controller subcomponent may transmit the query. The feature controller subcomponent may have direct access to the dependency repository.

Methods may also include receiving, at the feature controller subcomponent, in response to the query, from the dependency repository, one or more dependencies impactable by the incident.

Methods may include the feature controller subcomponent invoking a rule manager subcomponent. Methods may include receiving, at the rule manager subcomponent, one or more dependencies from the feature controller subcomponent. Methods may include the rule manager subcomponent turning off the operation of the one or more dependencies.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for an intelligent feature controller is provided. The intelligent feature controller may be operated by one or more hardware processors operating in tandem with one or more hardware memory devices.

The intelligent feature controller may include a listener subcomponent. The listener subcomponent may be operable to receive incident information. The incident information may be received from a plurality of monitors. Each monitor, included in the plurality of monitors, may monitor one or more applications, systems of features for failures or other suitable incidents. The incident information may include notification of an incident. Notification of an incident may invoke an artificial intelligence/machine learning powered main subcomponent.

The intelligent feature controller may include the artificial intelligence/machine learning powered main subcomponent.

The artificial intelligence/machine learning powered main subcomponent may receive a notification of an incident. The notification of the incident may be included in the incident information.

The main subcomponent may iterate through a historical database to identify similar historical incidents. The historical database may be owned by the main subcomponent. As such, the main subcomponent may have exclusive access to the historical database.

The iteration may utilize an artificial intelligence/machine learning algorithm. The similarity between a current incident and historical incidents may be defined by a location of the incident, a type of incident (such as failure to respond, failure to provide power or any other suitable type of incident) and any other suitable incident parameters. Similarity between two incidents may be identified when a predetermined percentage of parameters are within a predetermined range for the two incidents.

The main subcomponent may match a pattern of the incident to a pattern of one or more similar historical incidents. Based on an outcome of the one or more similar historical incidents, the main subcomponent may identify an outcome for the incident. The outcome for the incident may be either operational or failure. The main subcomponent may ignore the incident when the outcome of the incident is operational. The main subcomponent may invoke a feature controller subcomponent when the outcome of the incident is failure.

The intelligent feature controller may also include a feature controller subcomponent. The feature controller subcomponent may receive the notification of the incident. The feature controller subcomponent may generate a query. The query may include one or more details of a location of the incident. The location of the incident may be a server, computing device, memory location or any other suitable location. The feature controller subcomponent may transmit the query to a dependency repository. The dependency repository may store data relating to the dependencies between applications, features and systems within a network. As such, the dependency repository may be able to identify applications, features and systems that may be affected by the incident. The feature controller subcomponent, may receive, in response to the query, from the dependency repository, one or more dependencies impactable by the incident. The feature controller subcomponent may invoke a rule manager subcomponent. The rule manager subcomponent may be invoked in response to receiving the one or more dependencies from the feature controller subcomponent.

The rule manager subcomponent may receive the one or more dependencies from the feature controller subcomponent. The rule manager subcomponent may turn off the one or more dependencies.

The rule manager subcomponent may invoke an alert subcomponent. The alert subcomponent may alert stakeholders of the one or more dependencies regarding the turn off of the operation of the one or more dependencies.

In order for the artificial intelligence/machine learning powered main subcomponent to continuously understand new failures, the main subcomponent may also store details relating to the current incident and outcome at the historical database. Such details may include the notification of the incident, the outcome associated with the incident and/or when the outcome is failure, the one or more dependencies impactable by the incident.

In some embodiments, the intelligent feature controller may also turn on features that have been previously turned off. For example, if a feature was turned off by the feature controller and the feature has been remedied and becomes available again, the monitoring system may identify that the feature has been remedied. The listener subcomponent may receive a notification that the feature has been remedied. The intelligent feature controller subcomponent may identify the dependencies of the feature that has been remedied. The intelligent feature controller subcomponent may invoke the rule manager subcomponent. The rule manager subcomponent may turn on the feature that had been previously identified as failing. The rule manager subcomponent may also turn on the dependencies on the feature that has been previously identified as failing.

The following is a use case scenario of the intelligent feature controller. A payment system may include four features: a payment submission request feature, a payment approval processing feature, a transaction reporting feature and a payment status reporting feature. A vendor system may be down or unavailable to receive requests for providing vendor data.

In a prior art scenario, if a user would attempt to submit a payment submission request, the payment system would attempt to call the vendor system for vendor information. The vendor system may fail, and this exception may be handled by an internal application. The internal application may show an error that the vendor information is temporarily not available. As such, all four features within the payment system may also fail.

Using the intelligent feature controller, the monitoring system connected to the vendor system may identify the unavailability of the vendor system. The monitoring system may notify the listener within the intelligent feature controller. The intelligent feature controller may identify the payment submission request feature as being dependent on the vendor system. The intelligent feature controller may turn off the payment submission requests feature. The intelligent feature controller may also transmit a message regarding the turned off feature to stakeholders. The remaining features—i.e., the payment approval processing feature, the transaction reporting feature and the payment status reporting feature.

The following is another use case scenario of the intelligent feature controller. A file may need to be transmitted between a first entity and a second entity. When there are systems issues, for example, when a folder is not created automatically or a system is instable, the file may be required to be moved to an error state because of system issues, folder creation issues, network issues, data issues, file issues or any other issues. As such, the transfer of the file may require retriggering.

In a prior art scenario, when a file fails to transfer, there is a lag in the retriggering of the processing of the file. Manual intervention may be required to retrigger the transfer of the file.

Using the intelligent feature controller, a monitoring system connected an integrated system and transmitting system may identify the unavailability of the system or issues in generating/sending the file between systems. The system may inform the intelligent feature controller, which may identify the dependent features. The intelligent feature controller may also alert further processing of entries from the unavailable sources. As such, intelligent feature controller may turn off the systems dependent on the unavailable sources in order to avoid failures.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
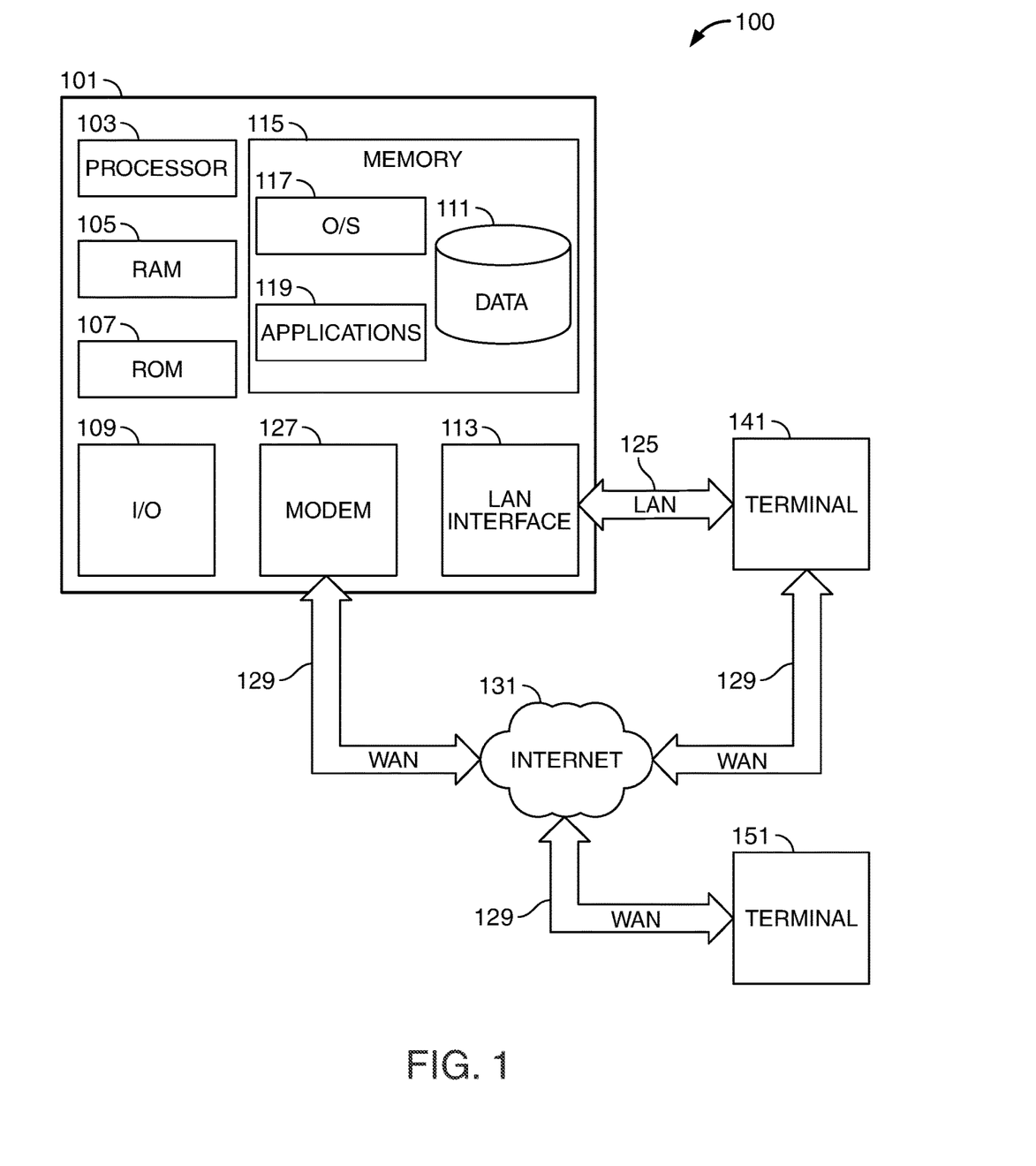
FIG. 1 shows an illustrative diagram in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to transaction pattern tracking and prediction.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
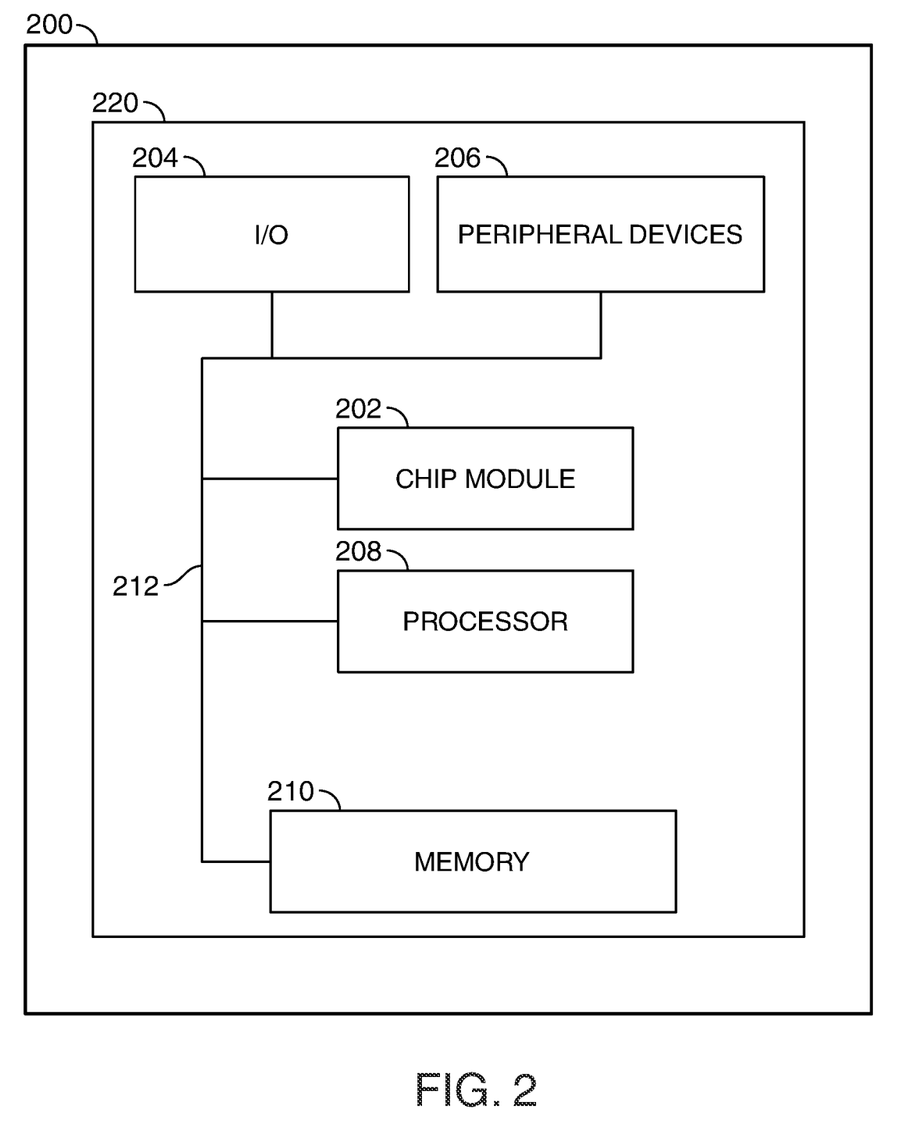
FIG. 2 shows another illustrative diagram in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
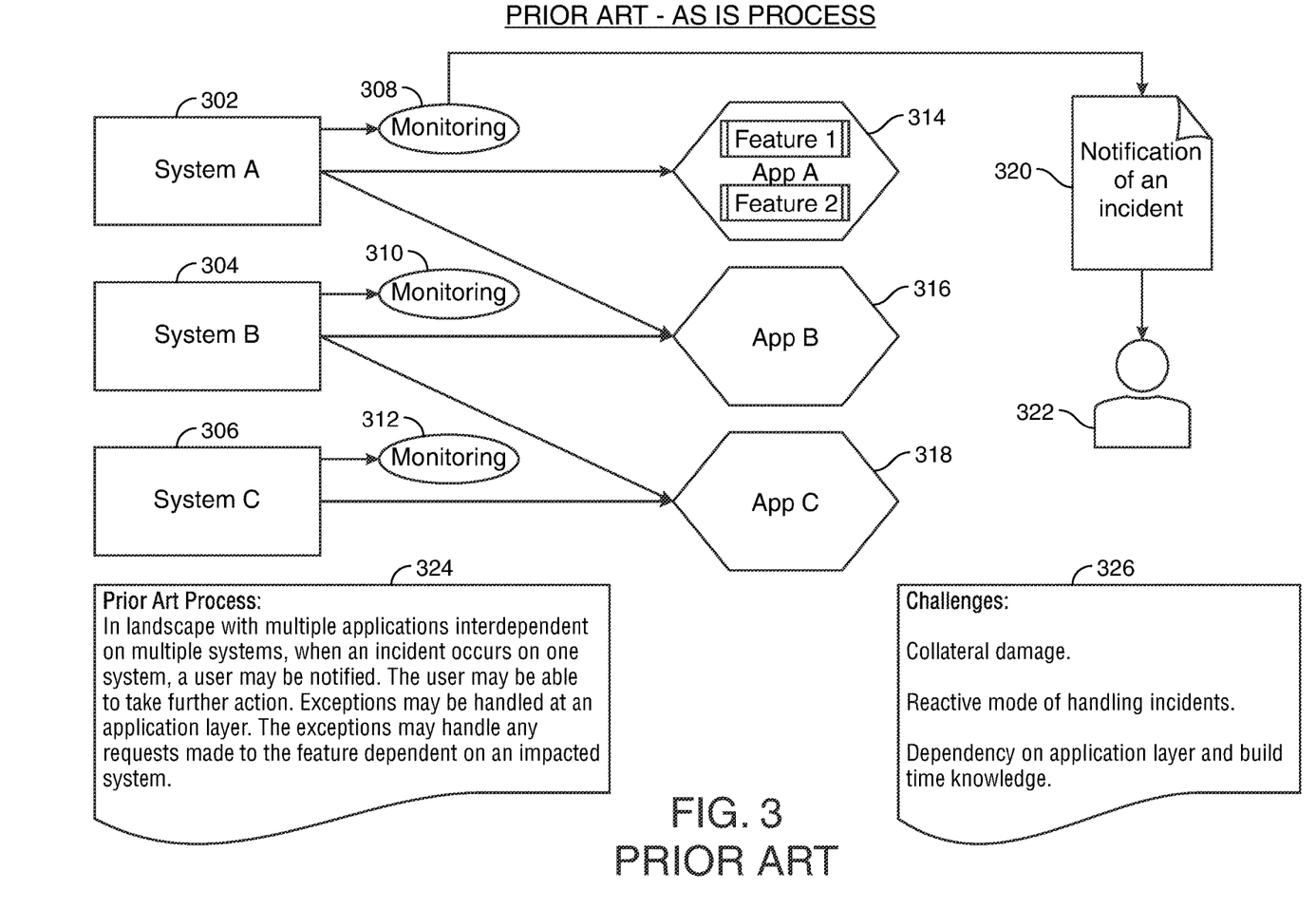
FIG. 3 shows a prior art diagram.

FIG. 3 shows a prior art software landscape. The prior art software landscape includes system A, shown at 302, system B, shown at 304, and system C, shown at 306. Each of systems A, B and C may be executing one or more applications and/or features. As such, system A may be executing feature 1, feature 2 and/or application A, shown at 314. Feature 1 and feature 2 may be associated with application A, shown at 314. System A, shown at 302, may also execute application B, shown at 316. System B, shown at 304, may execute application B, shown at 316. System B, shown at 304, may also execute application C, shown at 318. System C, shown at 306, may execute application C, shown at 318.

Each of systems A, B and C, may be monitored using one or more monitoring modules, such as monitoring module 308, monitoring module 310 and monitoring module 312.

In the event that a system, application or feature is unavailable or impacted, current processes include identifying the unavailability or impact, using one or more of monitoring modules 308, 310 and 312. The one or more monitoring modules 308, 310 and 312 may generate a notification of such an incident. The notification of such an incident, shown at 320, may be transmitted to a team, such as team 322. Team 322 may be an administrative team, or a production team. Team 322 may receive a call relating to the incident, and one or more teams may begin to work on the issue identified by the notification. This current landscape is a reactive approach. The team may attempt to remediate the issue only upon notification of the incident.

The as is process may be explained at 324. In a current landscape with multiple applications interdependent on multiple other applications, when an incident happens on one system, a user may be notified. The user may be able to execute further actions. Exceptions regarding the incident (such as failures that occur because of the incident) may be handled at the application layer. As such, each application may include its own set of exception handling in order to handle requests made to a feature dependent on an impacted system.

The challenges regarding the current landscape may be shown at 326. The challenges may include that the impacted system may incur collateral damage. The challenges may also include that there may be a reactive mode of handling incidents. The challenges may also include that there may be a dependency on the exception handling at the application layer. The challenges may also include a dependency on build time knowledge. Dependency on build time knowledge may include a dependency of the system on the knowledge of system attributes and what exceptions may occur during the building of the application. This knowledge may be difficult to identify, specifically because it may be difficult to identify all of the various production incidents that may occur when the landscape is built.

As such, it would be desirable for the system itself to take control of the incidents. Rather than waiting for an incident to occur and notifying a team member regarding the incident after the incident has occurred, it would be desirable for the landscape to be an intelligent landscape that can take control of an incident and remediate the incident without the involvement of one or more teams.

Figure 4:
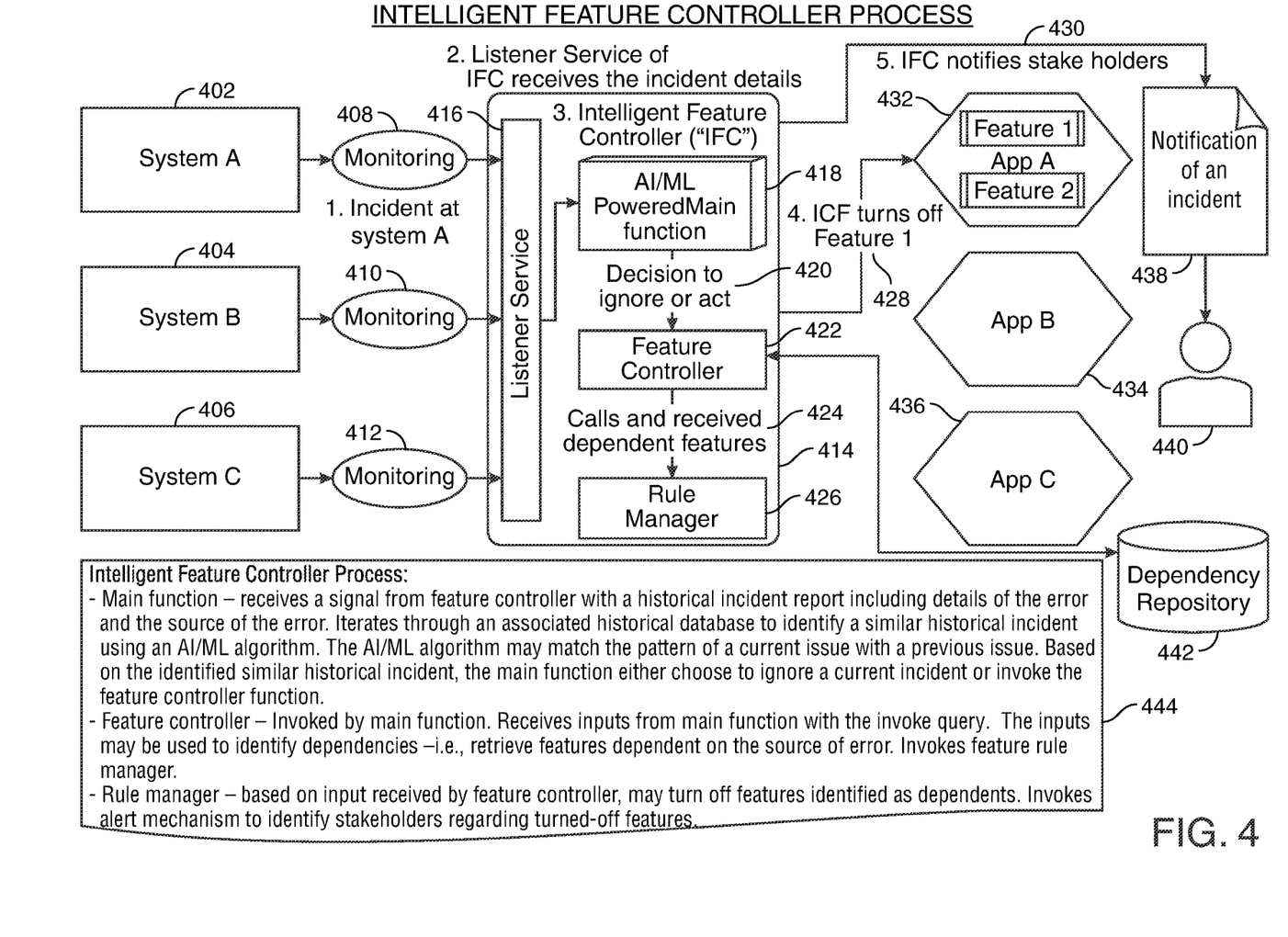
FIG. 4 also shows an illustrative diagram in accordance with principles of the disclosure.

FIG. 4 shows the intelligent feature controller working in tandem with the current landscape. System A, system B and system C, may be shown at 402, 404 and 406, respectively. Monitoring modules 408, 410 and 412 may monitor each of systems A, B and C, respectively. Intelligent feature controller may be shown at 414. Intelligent feature controller 414 may include a listener service, shown at 416. The listener service may be created using a vendor platform, such as Kafka®. The listener server, shown at 416 may receive information from each of monitoring modules 408, 410 and 412. Listener service 416 may listen to each of monitoring modules 408, 410 and 412 to identify incidents occurring to systems A, B or C.

Intelligent feature controller 414 may include three executable functions. The three executable functions may include main function, shown at 418, feature controller, shown at 422 and rule manager, shown at 426. Main function 418 may be powered by artificial intelligence and/or machine learning. Main function 418 may receive information relating to incidents from listener service 416. Main function may maintain its own database. Main function 418 may continuously record, within the database, every incident that occurs to systems A, B or C. Main function 418 may also record one or more actions that the intelligent feature controller executed to remediate the incident. As such, if a same or similar scenario reoccurs, main function 418 may be able to access the database to identify what actions may be required to remediate the incident. There can be certain alerts that may be ignored. As such, main function 418 may be able to determine, based on historical incidents and historical remediations, whether the incident may be acted upon or may be ignored, as shown at 420.

In the event that an action needs to be taken, Main function 418 may notify feature controller 422 regarding the actions that need to be taken. Feature controller 422 will check dependency repository 442 to identify which features will be impacted by the application or feature that incurred an incident. Feature controller 422 may identify a list of applications or features that may be impacted. Feature controller may call and receive dependent features from dependency repository 442, as shown at 424.

In order to identify whether the dependent applications or features need to be taken down during remediation of the original feature, feature controller 422 may rely on the information provided by rule manager 426. Rule manager 426 may turn off features identified as possible failures. Rule manager 426 may also alert the user about the failure. The user that receives the call may identify why the issue is occurring within the landscape and what is the root cause of the issue.

Intelligent feature controller may turn off feature 1, for example, as shown at 428. Feature 1 and feature 2 may be included in application A, as shown at 432. Application B, shown at 434 and application C, shown at 436, may also include one or more features. Intelligent feature controller may notify and/or alert stakeholders regarding an incident, as shown at 430. Notification of the incident 438 may be transmitted one or more stakeholders 440.

Process information of the intelligent feature controller may be shown at 444. The intelligent feature controller may include a main function, a feature controller and a rule manager. The main function may receive a signal from the feature controller upon completion of an incident. Upon completion of the incident, an incident report including details of the error and the source of the error may be generated. The incident report may be forwarded to the main function, which may store the incident report within the database for information identification at a later date. When an incident is received, from the listener service, the main function may identify similar incidents that previously occurred using the artificial intelligence/machine learning ("AI/ML") algorithm. The AI/ML algorithm may match the pattern of the incident with previous incidents. Based on the matched pattern, the main function may decide to ignore the incident or invoke the feature controller function.

The feature controller may be invoked by the main function upon identification of an incident that requires remediate. The feature controller may identify the dependencies, such as applications and features, that are dependent on the source of the error. The feature controller may invoke the feature rule manager.

The rule manager may be invoked by the feature controller. The feature controller may turn off features that are identified as dependencies to the source of the error. The rule manager may also invoke the alert mechanism.

Figure 5:
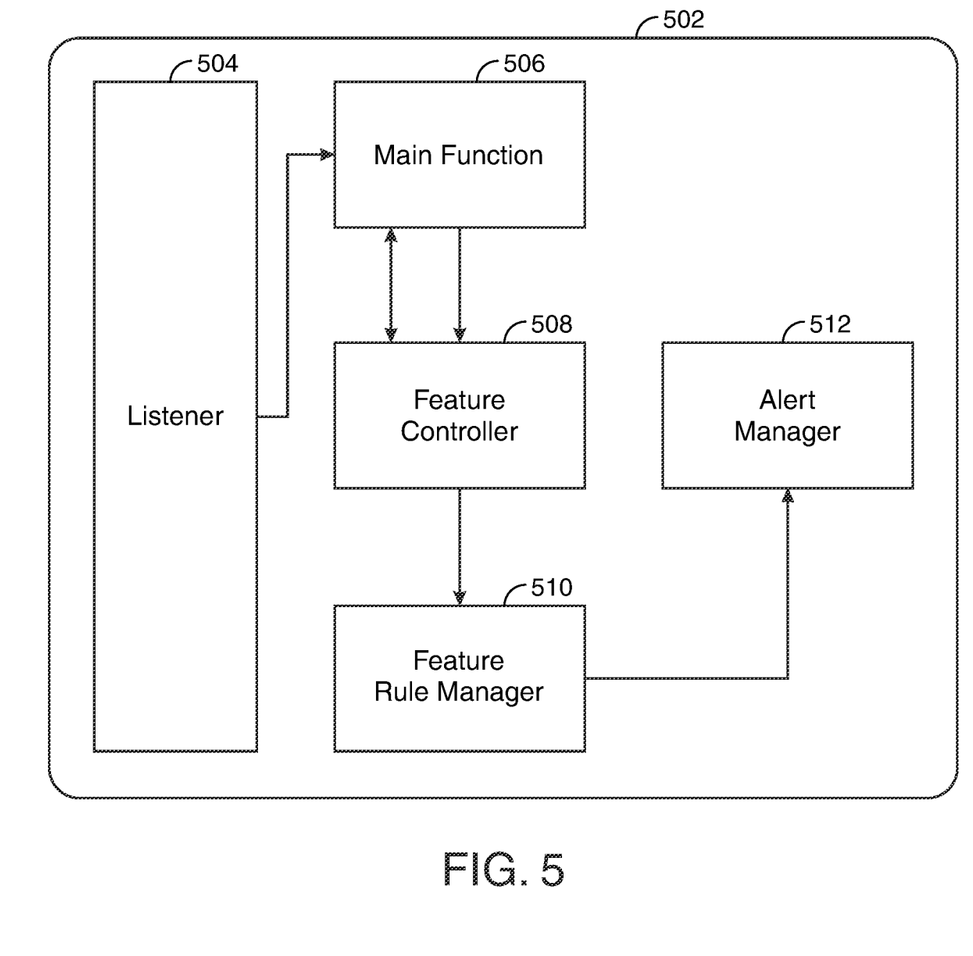
FIG. 5 shows another illustrative diagram in accordance with principles of the disclosure.

FIG. 5 shows an illustrative diagram. The illustrative diagram shows an intelligent feature controller 502. Intelligent feature controller 502 may include a listener 504, main function 506, feature controller 508, feature rule manager 510 and alert manager 512. Listener 504 may identify incidents or failures occurring within a system. Main function 506 may receive the indications of incidents or failures from listener 504. Main function 506 may identify whether the incident or failure has occurred previously. Main function 506 may identify, based on historical information, whether the incident can be ignored or will impact one or more other features or applications.

In the event that the incident can be ignored, main function 506 may store information relating to the incident and the response of the system to the incident (ignore) for future reference. In the event that the incident requires further execution, the incident may be transferred to feature controller 508. Feature controller 508 may identify zero or more dependencies on the failed feature. The dependencies may be other features and/or applications that may be affected by the failed feature. Feature controller 508 may instruct feature rule manager 510 to turn off the dependent features and/or applications. Feature controller 508 may instruct main function 502 to store information relating to the failed feature and the response of the system to the incident (which dependencies were turned off) for future reference.

Feature rule manager 510 may invoke alert manager 512. Alert manager 512 may alert stakeholders associated with the turned-off dependencies regarding the turn-off and the reason for the turn-off (the failed feature).

Figure 6:
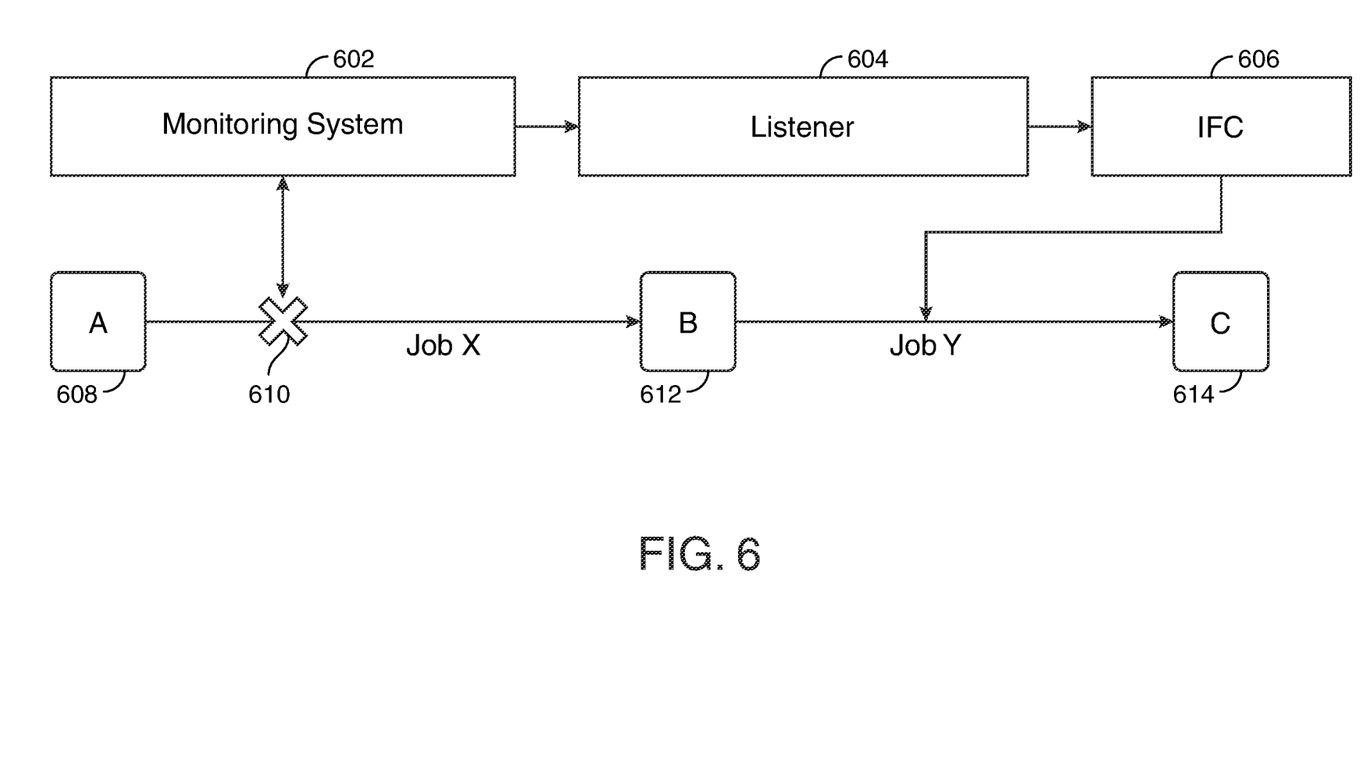
FIG. 6 shows yet another illustrative diagram in accordance with principles of the disclosure.

FIG. 6 shows an illustrative diagram. System A is shown at 608. System B is shown at 612. System C is shown at 614. In a data flow scenario, data may flow from system A to system B to system B. System A may communicate with system B. As such, system B may be dependent on system A. System B may communicate with system C. As such, system C may be dependent on system B.

Monitoring system 602 identify failure 610. Failure 610 may occur during a communication between system A and system B. Failure 610 may include the following scenario: Job X, which may load data from system A to system B, fails because of an inconsistent data type. Job Y, which may feed to same data that is included in the job X, from system B to system C, may need to be halted and system B and C, and associated stakeholders, may need to be alerted.

Listener 604 may receive identification of the failure from monitoring system 602. Intelligent feature controller ("IFC") 606 may be apprised on the failure from listener 604. IFC 606 may determine, from previous historical experiences, that failure 610 may result in an additional failure in the communications between system B and system C. As such, IFC 606 may identify, using a dependency repository, dependent systems, features, applications and/or jobs. As such, IFC 606 may turn off one or more features, jobs and/or applications that may be affected by the failure (such as Job Y). The one or more features and/or applications that may be affected by the failure may be included in system B, system C and/or in the communications between systems B and C.

Figure 7:
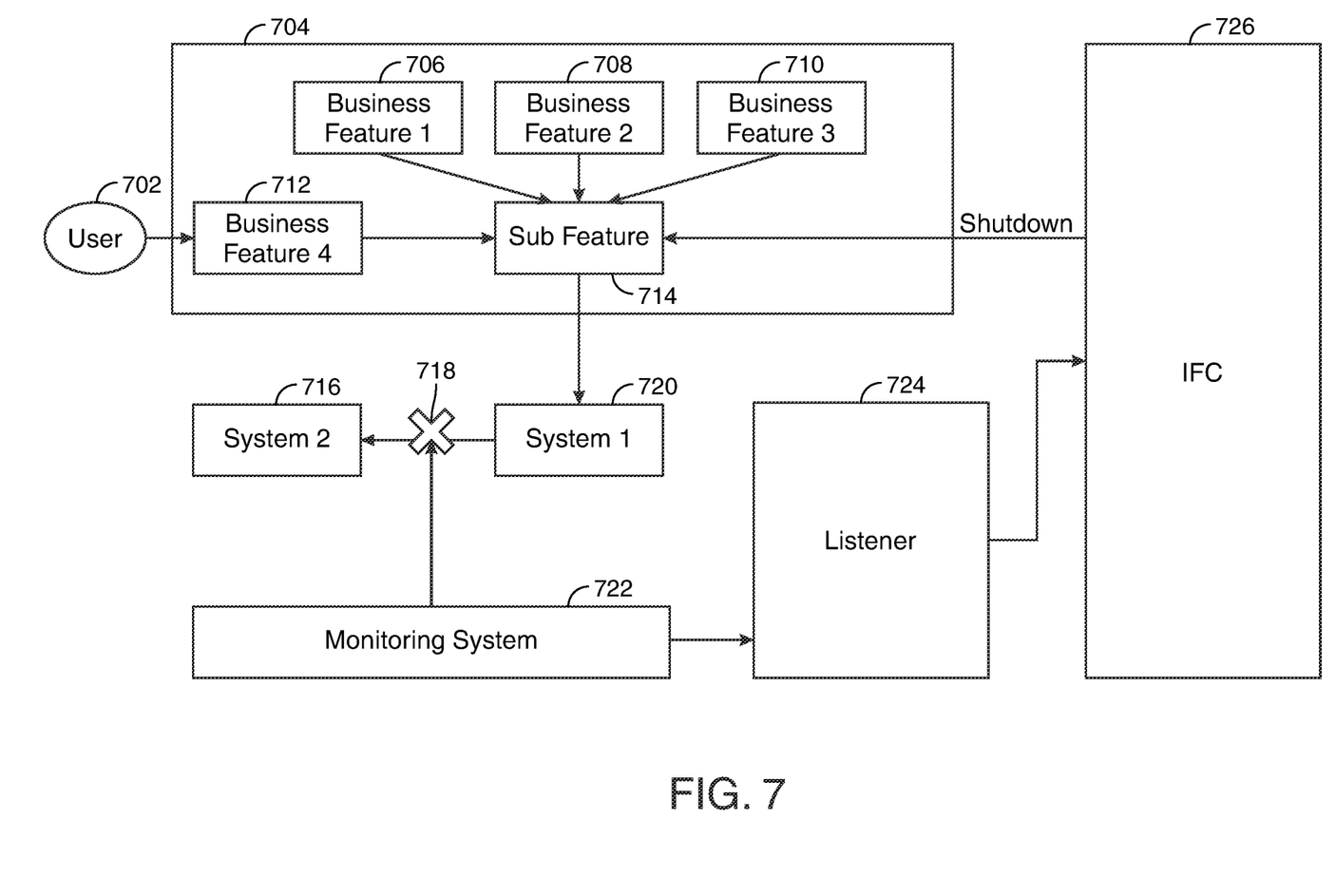
FIG. 7 shows still another illustrative diagram in accordance with principles of the disclosure.

FIG. 7 shows an illustrative diagram. The illustrative diagram shows user 702 accessing module 704. User 702 may access module 704 for invoice processing. Invoice processing may leverage a common sub-feature. The sub-feature may be named file upload. Module 702 may include various business features, such as business feature 1, shown at 706, business feature 2, shown at 708, business feature 3, shows at 710 and business feature 4, shown at 712. Each of business features 706, 708, 710 and 712 may be dependent on sub-feature 714. Sub-feature 714 may be named file upload.

Sub-feature 714, also referred to as file upload, may connect with system 1, shown at 720. As such, sub-feature 714 may be dependent system 1, shown at 720. System 1 may integrate with system 2 for authentication. System 1 may be dependent on system 2, shown at 716. If system 2 incurs a failure, system 1 may not be able to establish a secure connection with other modules, such as module 704.

Monitoring system 722 may monitor the following modules, features and systems for failures: module 704 and associated features and sub-features, system 1 and system 2.

Monitoring system 722 may identify a failure for system 1 to use system 2 to initiate a secure connection with sub-feature 714. Listener 724 may inform IFC 726 to act on the dependent features. Because sub-feature 714 is a common utility and/or service, the failure of sub-feature 714 may impact multiple business features, such as business feature 1, business feature 2, business feature 3 and business feature 4. The impact of failure of sub-feature 714 may be handled by IFC 726. IFC 726 may shutdown sub-feature 714. IFC 726 may also update business features 1-4 to turn off the components of the business features that are dependent on sub-feature 714.

Thus, systems and methods for intelligently controlling features within a system is provided. Persons skilled in the art will appreciate that the present invention can be practiced by other than the described embodiments, which are presented for purposes of illustration rather than of limitation. The present invention is limited only by the claims that follow.

What is claimed is:

1. An intelligent feature controller apparatus operating on a hardware processor operating with a hardware memory, the intelligent feature controller apparatus comprising:
    a listener subcomponent, the listener subcomponent operable to:
        receive incident information from a plurality of monitors, each monitor, included in the plurality of monitors, monitors one or more applications, systems or features for failures;
    an artificial intelligence/machine learning powered main subcomponent, the artificial intelligence/machine learning powered main subcomponent operable to:
        receive a notification of an incident, the notification of the incident included in the incident information, the incident comprising failure to automatically generate a file;
        iterate through a historical database to identify similar historical incidents using an artificial intelligence/machine learning algorithm;
        match, based on a set of incident parameters, a pattern of the incident to a pattern of one or more similar historical incidents, said similar historical incidents identified when a predetermined percentage of the set of incident parameters of the incident are within a predetermined range for incident parameters included in the historical incidents;
        based on an outcome of the one or more similar historical incidents, identify an outcome of the incident being failure;
        invoke a feature controller subcomponent;
    the feature controller subcomponent, the feature controller subcomponent operable to:
        receive the notification of the incident;
        generate a query, the query comprising one or more details of a location of the incident;
        transmit the query to a dependency repository;
        identify, at the dependency repository, one or more dependencies, said one or more dependencies comprising a first set of electronic file entries dependent on the file as a source application;
        receive, in response to the query, from the dependency repository, the one or more dependencies; and
        invoke a rule manager subcomponent;
    the rule manager subcomponent, the rule manager subcomponent operable to:
        receive the one or more dependencies from the feature controller subcomponent; and
        turn off the operation of the one or more dependencies comprising the first set of electronic file entries;
        maintain operation of a second set of application features, said second set of application features related to the first set of electronic file entries and functionally independent from the source application;
        receive a notification that the file has been retriggered; and
        electronically activate the one or more dependencies comprising the first set of electronic file entries.

2. The apparatus of claim 1 wherein the historical database is operated by the main subcomponent.

3. The apparatus of claim 1 wherein the notification of the incident invokes operation of the main subcomponent.

4. The apparatus of claim 1 wherein the one or more dependencies include systems, applications and features.

5. The apparatus of claim 1 wherein the rule manager subcomponent is further operable to invoke an alert subcomponent.

6. The apparatus of claim 5 further comprising the alert subcomponent, the alert subcomponent is operable to alert stakeholders of the one or more dependencies regarding the turn off of the operation of the one or more dependencies.

7. The apparatus of claim 5 wherein the artificial intelligence/machine learning powered main subcomponent is further operable to store, at the historical database:
    the notification of the incident;
    the outcome associated with the incident; and
    when the outcome is failure, the one or more dependencies impactable by the incident.

8. A method for intelligently controlling features within a computing environment, the method comprising:
    monitoring, by one or more monitors, one or more applications, systems or features for incidents;
    actively listening, at a listener subcomponent, for incident information from the one or more monitors;
    receiving, at an artificial intelligence/machine learning powered main subcomponent, notification of an incident, said notification of the incident comprising incident details, said incident comprising failure to automatically generate a file;
    iterating, at the artificial intelligence/machine learning powered main subcomponent, through a historical database to identify similar historical incidents using an artificial intelligence/machine learning algorithm;
    matching, based on a set of incident parameters, at the artificial intelligence/machine learning powered main subcomponent, a pattern of the incident to a pattern of one or more similar historical incidents, said similar historical incidents identified when a predetermined percentage of the set of incident parameters of the incident are within a predetermined range for incident parameters included in the historical incidents;
    identifying, at the artificial intelligence/machine learning powered main subcomponent, an outcome for the incident based on an outcome of the one or more similar historical incidents, said outcome for the incident being failure;
    invoking, at the artificial intelligence/machine learning powered main subcomponent, a feature controller subcomponent;
    receiving, at the feature controller subcomponent, a notification of the incident;
    generating, at the feature controller subcomponent, a query comprising one or more details of a location of the incident;

transmitting, at the feature controller subcomponent, the query to a dependency repository;
identifying, at the dependency repository, one or more dependencies, said one or more dependencies comprising a first set of electronic file entries dependent on the file as a source application;
receiving, at the feature controller subcomponent, in response to the query, from the dependency repository, the one or more dependencies;
invoking, by the feature controller subcomponent, a rule manager subcomponent;
receiving, at the rule manager subcomponent, one or more dependencies from the feature controller subcomponent; and
turning off, by the rule manager subcomponent, the one or more dependencies comprising the first set of electronic file entries;
maintaining operation of a second set of application features, said second set of application features related to the first set of electronic file entries and functionally independent from the source application;
receiving a notification that the file has been retriggered; and
electronically activating the one or more dependencies comprising the first set of electronic file entries.

9. The method of claim 8 wherein the historical database is operated by the main subcomponent.

10. The method of claim 8 wherein the notification of the incident invokes operation of the main subcomponent.

11. The method of claim 8 wherein the one or more dependencies include systems, applications and features.

12. The method of claim 8 further comprising invoking, by the rule manager subcomponent, an alert subcomponent.

13. The method of claim 12 further comprising alerting, by the alert subcomponent, stakeholders of the one or more dependencies regarding the turn off of the operation of the one or more dependencies.

14. The method of claim 8 further comprising storing, by the artificial intelligence/machine learning powered main subcomponent, at the historical database:
the notification of the incident;
the outcome associated with the incident; and
when the outcome is failure, the one or more dependencies impactable by the incident.

15. A method for intelligently controlling features within a computing environment, the method comprising:
monitoring, by one or more monitors, one or more applications, systems or features for incidents;
actively listening, at a listener subcomponent, for incident information from the one or more monitors;
receiving, at an artificial intelligence/machine learning powered main subcomponent, notification of an incident, said notification of the incident comprising incident details, said incident comprising failure to automatically generate a file;
iterating, at the artificial intelligence/machine learning powered main subcomponent, through a historical database to identify similar historical incidents using an artificial intelligence/machine learning algorithm;
matching, based on a set of incident parameters, at the artificial intelligence/machine learning powered main subcomponent, a pattern of the incident to a pattern of one or more similar historical incidents, said similar historical incidents identified when a predetermined percentage of the set of incident parameters of the incident are within a predetermined range for incident parameters included in the historical incidents;
identifying, at the artificial intelligence/machine learning powered main subcomponent, an outcome for the incident based on an outcome of the one or more similar historical incidents, said outcome for the incident being failure;
invoking, at the artificial intelligence/machine learning powered main subcomponent, a feature controller subcomponent;
receiving, at the feature controller subcomponent, a notification of the incident;
generating, at the feature controller subcomponent, a query comprising one or more details of a primary feature involved in the incident;
transmitting, at the feature controller subcomponent, the query to a dependency repository;
identifying, at the dependency repository, one or more dependencies, said one or more dependencies comprising a first set of electronic file entries dependent on the file as the primary feature;
receiving, at the feature controller subcomponent, in response to the query, from the dependency repository, the one or more dependencies;
invoking, by the feature controller subcomponent, a rule manager subcomponent;
receiving, at the rule manager subcomponent, the one or more dependencies from the feature controller subcomponent;
turning off, by the rule manager subcomponent, the one or more dependencies comprising the first set of electronic file entries;
maintaining operation of a second set of application features, said second set of application features related to the first set of electronic file entries and functionally independent from the primary feature;
receiving, at an artificial intelligence/machine learning powered main subcomponent, notification that the file has been retriggered; and
electronically activating, by the rule manager subcomponent, the one or more dependencies comprising the first set of electronic file entries.

16. The method of claim 15 wherein the historical database is operated by the main subcomponent.

17. The method of claim 15 wherein the notification of the incident invokes operation of the main subcomponent.

18. The method of claim 15 wherein the one or more dependencies include systems, applications and features.

19. The method of claim 15 further comprising invoking, by the rule manager subcomponent, an alert subcomponent.

20. The method of claim 19 further comprising alerting, by the alert subcomponent, stakeholders of the one or more dependencies regarding the turn off of the operation of the one or more dependencies.

* * * * *